(12) United States Patent
Zhao et al.

(10) Patent No.: US 10,878,069 B2
(45) Date of Patent: *Dec. 29, 2020

(54) LOCKING AND UNLOCKING A MOBILE DEVICE USING FACIAL RECOGNITION

(71) Applicant: Apple Inc., Cupertino, CA (US)

(72) Inventors: Lihua Zhao, Cupertino, CA (US); Richard Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/849,535

(22) Filed: Dec. 20, 2017

(65) Prior Publication Data
US 2018/0211024 A1    Jul. 26, 2018

Related U.S. Application Data

(63) Continuation of application No. 15/276,732, filed on Sep. 26, 2016, now Pat. No. 9,875,349, which is a (Continued)

(51) Int. Cl.
*G06F 21/32*    (2013.01)
*G06K 9/00*    (2006.01)
(Continued)

(52) U.S. Cl.
CPC ......... *G06F 21/32* (2013.01); *G06K 9/00228* (2013.01); *G06K 9/00288* (2013.01); (Continued)

(58) Field of Classification Search
CPC .......... G06F 21/32; G06F 21/00; G06F 21/31; H04W 12/06; H04W 88/02; (Continued)

(56) References Cited

U.S. PATENT DOCUMENTS 7,173,534 B1    2/2007    Markham et al.
7,848,388 B2 *  12/2010   Tudosoiu ............. H04B 1/7115
                                                         375/147
(Continued)

FOREIGN PATENT DOCUMENTS

GB    2452017 A  *  2/2009    ............. H04M 1/67
JP    2007249797        9/2010

OTHER PUBLICATIONS

"Lock-Unlock Your Phone Automatically Now—Without Pressing Any Button", printed from Internet on Nov. 2, 2010, http://techinfo.co.in/wordpress/lock-unlock-your-phone-automatically-now-without-pressing-any-button; (Jul. 20, 2010), pp. 1-5.
(Continued)

*Primary Examiner* — Yong Hang Jiang
(74) *Attorney, Agent, or Firm* — Womble Bond Dickinson (US) LLP

(57) ABSTRACT

In an embodiment of the invention, an unlocked mobile device is configured to capture images, analyze the images to detect a user's face, and automatically lock the device in response to determining that a user's face does not appear in the images. The camera capturing and face recognition processing may be triggered by the device having detected that it has been motionless for a threshold period of time. In another embodiment, a locked mobile device is configured to capture an initial image using its camera, capture a new image in response to detecting movement of the device, determine that the device moved to a use position, capture a subsequent image in response to determining that the device moved to a use position, analyze the subsequent image to detect a user's face, and unlock the device in response to detecting the user's face. Other embodiments are also described and claimed.

28 Claims, 4 Drawing Sheets

Related U.S. Application Data continuation of application No. 14/624,443, filed on Feb. 17, 2015, now Pat. No. 9,477,829, which is a continuation of application No. 13/049,614, filed on Mar. 16, 2011, now Pat. No. 8,994,499.

(51) Int. Cl.
*H04W 12/06* (2009.01)
*H04W 88/02* (2009.01)
*H04L 29/06* (2006.01)

(52) U.S. Cl.
CPC ......... *H04W 12/06* (2013.01); *H04L 63/0861* (2013.01); *H04W 88/02* (2013.01)

(58) Field of Classification Search
CPC ............ H04L 63/0861; G07C 9/00031; G06K 9/00228; G06K 9/00288
USPC .... 340/5.1, 5.2, 5.21, 5.52, 5.53, 5.81, 5.82, 340/5.83
See application file for complete search history.

(56) References Cited

U.S. PATENT DOCUMENTS

| | | | |
|---|---|---|---|
| 8,149,089 B2 | 4/2012 | Lin et al. | |
| 8,261,090 B1* | 9/2012 | Matsuoka | G06F 21/32 713/186 |
| 9,953,152 B2 | 4/2018 | Fadell et al. | |
| 2003/0020688 A1 | 1/2003 | Norskog et al. | |
| 2003/0045274 A1* | 3/2003 | Nishitani | G10H 1/0058 455/414.1 |
| 2006/0056664 A1* | 3/2006 | Iwasaki | G06K 9/00248 382/115 |
| 2006/0239336 A1 | 10/2006 | Baraniuk et al. | |
| 2006/0242434 A1 | 10/2006 | Lee | |
| 2007/0188303 A1* | 8/2007 | Faro | G07C 9/00103 340/5.73 |
| 2007/0259685 A1 | 11/2007 | Engblom | |
| 2008/0189783 A1 | 8/2008 | Music et al. | |
| 2009/0026979 A1* | 1/2009 | Reid | H05B 37/02 315/297 |
| 2009/0070798 A1 | 3/2009 | Lee et al. | |
| 2009/0160609 A1* | 6/2009 | Lin | G06F 21/32 340/5.83 |
| 2009/0184801 A1 | 7/2009 | Bliding et al. | |
| 2009/0258667 A1* | 10/2009 | Suzuki | B66B 1/46 455/550.1 |
| 2009/0320123 A1 | 12/2009 | Yu et al. | |
| 2010/0031072 A1 | 2/2010 | Hung | |
| 2011/0151934 A1 | 6/2011 | Geng | |
| 2011/0216209 A1 | 9/2011 | Fredlund et al. | |
| 2011/0254691 A1* | 10/2011 | Ooi | G09G 5/10 340/635 |
| 2012/0060123 A1 | 3/2012 | Smith | |
| 2012/0093374 A1 | 4/2012 | Fan | |
| 2012/0219180 A1* | 8/2012 | Mehra | G06K 9/00335 382/103 |

OTHER PUBLICATIONS

"Unlock Your Computer with a Smile", BananaScreen Review—BananaScreen Download—Softpedia; printed from Internet on Nov. 2, 2010; http://www.softpedia.com/reviews/windows/BananaScreen-Review-070703.shtml, (Jul. 23, 2007), pp. 1-3.

* cited by examiner

LOCKING AND UNLOCKING A MOBILE DEVICE USING FACIAL RECOGNITION

This application is a continuation of co-pending U.S. application Ser. No. 15/276,732 filed on Sep. 26, 2016, which is a continuation of U.S. application Ser. No. 14/624,443 filed on Feb. 17, 2015, now issued as U.S. Pat. No. 9,477,829, which is a continuation of U.S. application Ser. No. 13/049,614 filed on Mar. 16, 2011, now issued as U.S. Pat. No. 8,994,499.

The various embodiments of the invention relate to locking and unlocking a mobile device. Other embodiments are also described.

BACKGROUND

Many mobile devices have a lock mode. The lock mode may be used to prevent inadvertent operation of a touch screen display, e.g., while the device is in a user's pocket or purse or when another object is placed against the device. The lock mode may also be used to prevent an unauthorized person from using the device. Generally, the device is programmed to enter the lock mode when a user presses a specific button or a series of buttons or when it has been idle for a certain period of time. When a user desires to use a device that is locked, the user will typically be required to drag a slide bar, press a specific button or a series of buttons (e.g., to enter a password) to unlock the device. However, a user may find these steps inconvenient and time consuming. For example, a user may be reading a document using the device when the device detects that it has been idle for a certain period of time. In this case, the device will automatically enter the lock mode where it turns off or dims its display screen, and the user will be required to unlock the device before being able to resume reading the document. In another example, a user may be prone to forgetting the password needed to unlock the device. As a result, the user may decide to configure the device so that it does not automatically lock. If she then forgets or chooses not to manually lock her device, that leaves the device susceptible to inadvertent operation or unauthorized use.

SUMMARY

In an embodiment of the invention, a mobile device is configured to automatically lock based on determining that a user's face is no longer present in images captured by the device's built-in camera. For instance, consider that the device is initially unlocked. In that state, a built-in camera captures one or more images, and the images are then analyzed to determine whether a user's face is present therein. If a user's face is not present in the images captured over a predetermined amount of time, the device automatically locks. Thus, the device is automatically locked when it determines that no user is currently using the device without having to wait for an idle timer to expire or a manual switch off by the user. The camera capturing and face recognition processing may be triggered by the device having detecting that it has been motionless for a threshold period of time.

In another embodiment, a mobile device is configured to automatically unlock. Consider that the device is initially locked. In that state, the camera captures an initial image. When movement of the device is detected, the camera captures a new image. The device then determines whether it has moved to a use position (i.e., a position that indicates that a user is likely to want to use the device) by comparing the new image with the initial image. If the device has moved to a use position, the camera captures a subsequent image, and the subsequent image is analyzed to detect a user's face. If a user's face is detected in the subsequent image, the device is automatically unlocked. This unlocks the locked device without requiring the user to press a sequence of buttons (e.g., to enter a password) each time the user wants to use the device.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Embodiments of the invention will now be described with reference to the drawings summarized below. The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
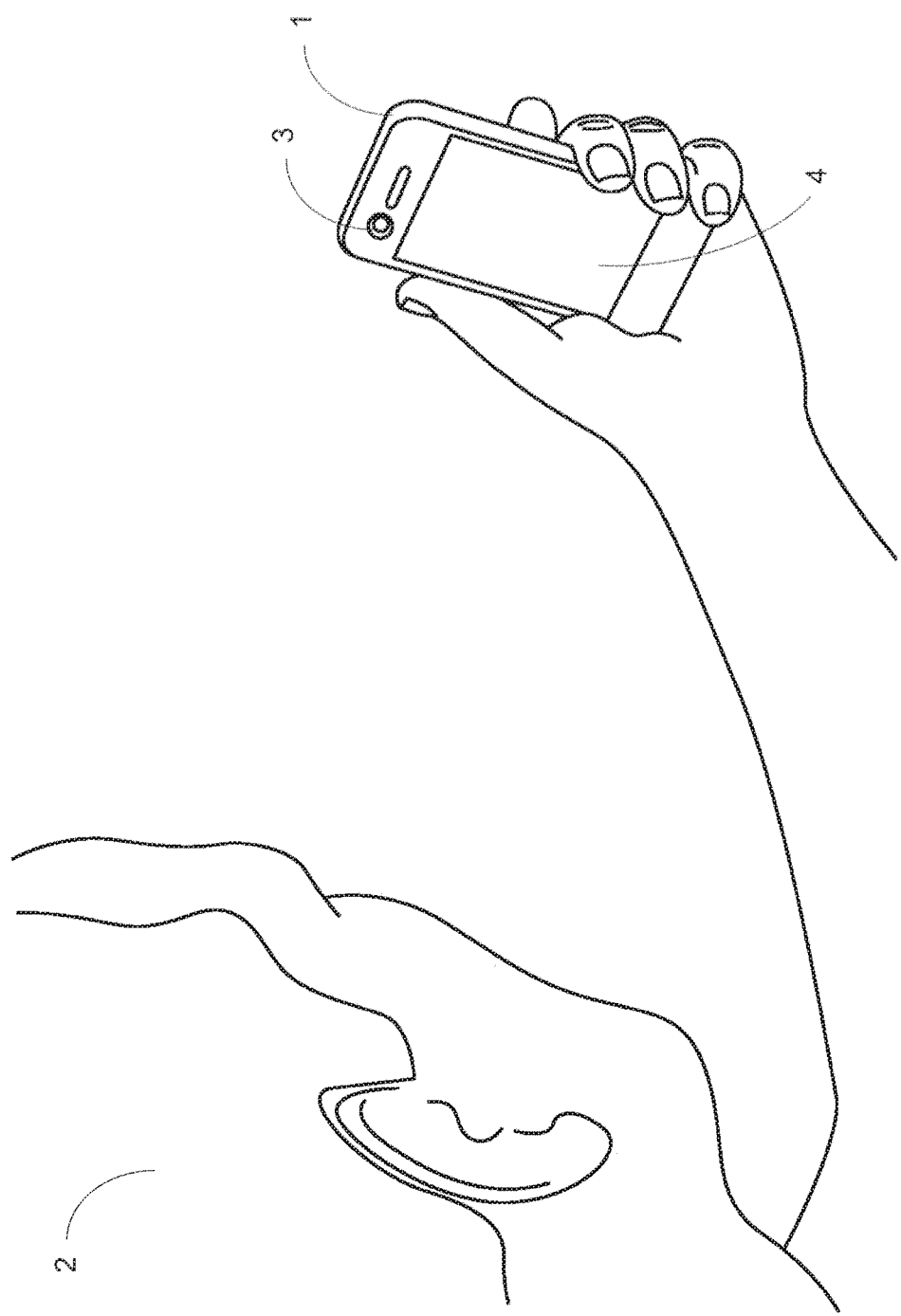
FIG. 1 illustrates an example mobile device in use.

FIG. 1 shows a mobile device 1 being held by a user 2 in a manner such that the device 1 is unlocked or remains unlocked by detecting a user's face. The device 1 may be any one of several different types of small consumer electronic devices that can be easily held in the user's hands during normal use. In particular, the device 1 may be any camera-equipped mobile device, such as a cellular phone, a smart phone, a media player, or a tablet-like portable computer, all of which may have a built-in camera. The device 1 may have an exterior front face in which there is a front-facing camera 3 and a display screen 4. As will be more fully explained below, camera 3 is used to capture an image of the device user 2 while the user is facing the display screen 4, in order to unlock the device 1 or to keep the device unlocked. Camera 3 may also be used to capture an image of the user 2 that may later be used to authenticate the user as an authorized user of the device 1.

Figure 2:
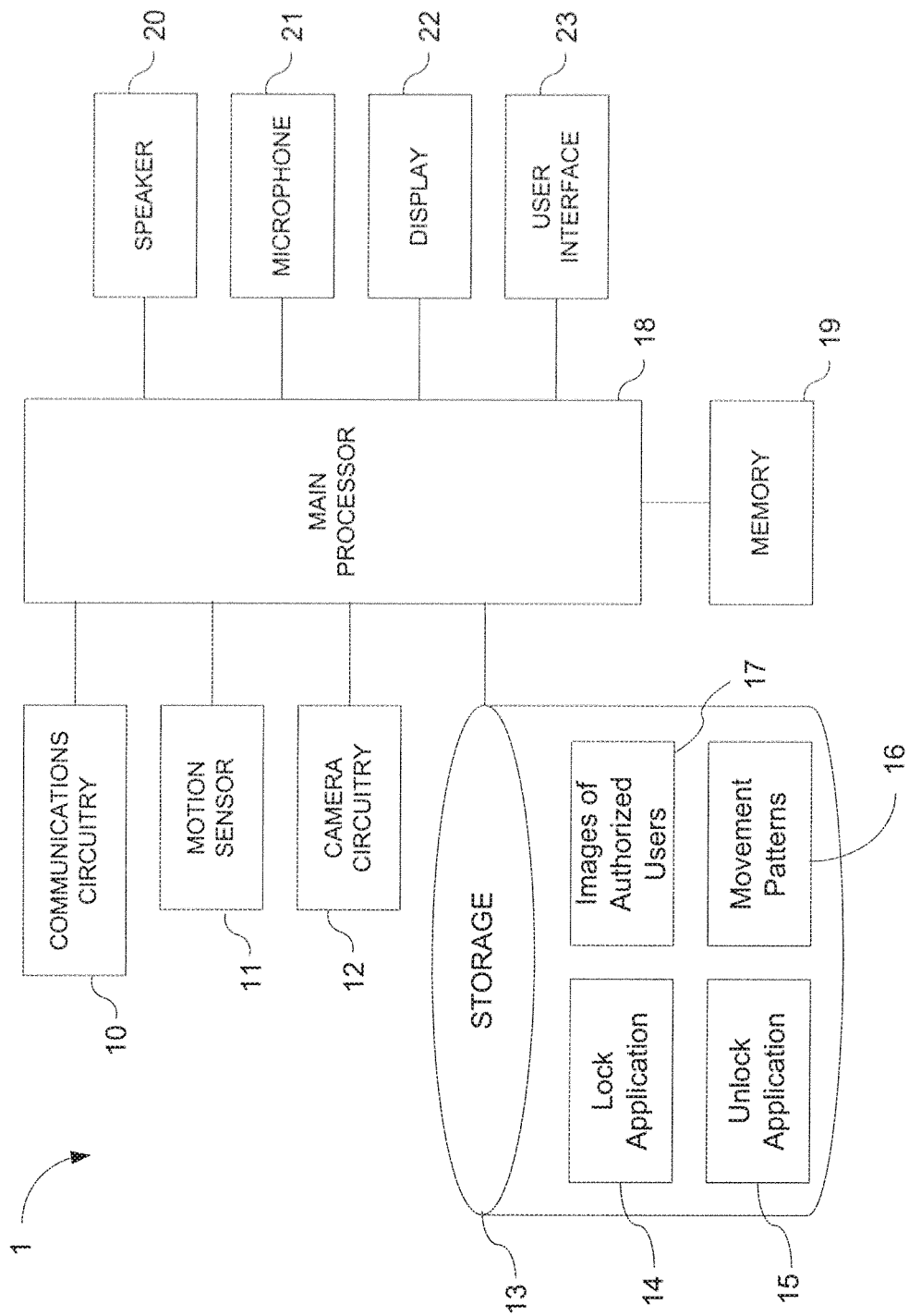
FIG. 2 is a block diagram of some of the constituent components of an example mobile device.

FIG. 2 is an example block diagram of the device 1. The device 1 includes a main processor 18 that interacts with a motion sensor 11, camera circuitry 12, storage 13, memory 19, display 22, and user interface 23. The device 1 may also interact with communications circuitry 10, a speaker 20, and a microphone 21. The various components of the device 1 may be digitally interconnected and used or managed by a software stack being executed by the main processor 18. Many of the components shown or described here may be implemented as one or more dedicated hardware units and/or a programmed processor (software being executed by a processor, e.g., the main processor 18).

The main processor 18 controls the overall operation of the device 1 by performing some or all of the operations of one or more applications implemented on the device 1, by executing instructions for it (software code and data) that may be found in the storage 13. The processor may, for example, drive the display 22 and receive user inputs through the user interface 23 (which may be integrated with the display 22 as part of a single, touch sensitive display panel, e.g., display panel 4 of FIG. 1, on the front face of the mobile device 1). The main processor 18 may also control the locking and unlocking functions of the device 1.

Storage 13 provides a relatively large amount of "permanent" data storage, using nonvolatile solid state memory (e.g., flash storage) and/or a kinetic nonvolatile storage device (e.g., rotating magnetic disk drive). Storage 13 may include both local storage and storage space on a remote server. Storage 13 may store data, such as image data of authorized users 17 and data of movement patterns 16, and software components that control and manage, at a higher level, the different functions of the device 1. For instance, there may be a locking application 14 and an unlocking application 15 that configure the camera circuitry 12 to capture images for detection of a user's face.

In addition to storage 13, there may be memory 19, also referred to as main memory or program memory, which provides relatively fast access to stored code and data that is being executed by the main processor 18. Memory 19 may include solid state random access memory (RAM), e.g., static RAM or dynamic RAM. There may be one or more processors, e.g., main processor 18, that run or execute various software programs, modules, or sets of instructions (e.g., applications) that, while stored permanently in the storage 13, have been transferred to the memory 19 for execution, to perform the various functions described above. It should be noted that these modules or instructions need not be implemented as separate programs, but rather may be combined or otherwise rearranged in various combinations. In addition, the enablement of certain functions could be distributed amongst two or more modules, and perhaps in combination with certain hardware.

The device 1 may include communications circuitry 10. Communications circuitry 10 may include components used for wired or wireless communications, such as two-way conversations and data transfers. For example, communications circuitry 10 may include RF communications circuitry that is coupled to an antenna, so that the user of the device 1 can place or receive a call through a wireless communications network. The RF communications circuitry may include a RF transceiver and a cellular baseband processor to enable the call through a cellular network. In another embodiment, communications circuitry 10 may include Wi-Fi communications circuitry so that the user of the device 1 may place or initiate a call using voice over Internet Protocol (VOIP) connection, through a wireless local area network.

The device 1 may include a motion sensor 11, also referred to as an inertial sensor, that may be used to detect movement of the device 1. The motion sensor 11 may include a position, orientation, or movement (POM) sensor, such as an accelerometer, a gyroscope, a light sensor, an infrared (IR) sensor, a proximity sensor, a capacitive proximity sensor, an acoustic sensor, a sonic or sonar sensor, a radar sensor, an image sensor, a video sensor, a global positioning (GPS) detector, an RP detector, an RF or acoustic doppler detector, a compass, a magnetometer, or other like sensor. For example, the motion sensor 11 may be a light sensor that detects movement or absence of movement of the device 1, by detecting the intensity of ambient light or a sudden change in the intensity of ambient light. The motion sensor 11 generates a signal based on at least one of a position, orientation, and movement of the device 1. The signal may include the character of the motion, such as acceleration, velocity, direction, directional change, duration, amplitude, frequency, or any other characterization of movement. The processor 18 receives the sensor signal and controls one or more operations, e.g., the unlocking function described below, of the device 1 based in part on the sensor signal.

In one embodiment, the device 1 may include movement patterns 16 that are stored in storage 13. A movement pattern may be associated with a function, e.g., the unlocking function, of the device 1. For example, the processor 18 may compare the sensor signal with the stored movement patterns 16 to determine whether the user moved the device 1 to a use position, i.e., a position that indicates that the user is likely to want to use the device. The comparing function may include employing a pattern recognition algorithm or technique or a statistical model. In another embodiment, the processor 18 may use the sensor signal to infer or calculate tilt or inclination of the device 1 relative to a static, linear acceleration (i.e., gravity) by correlating tilt angles with detected linear acceleration. In this way, the processor 18 may calculate or infer when the device 1 is subjected to dynamic accelerations by, for example, the hand of the user. In yet another embodiment, the motion sensor 11 may include other signal processing circuits such as a low pass filter, a threshold detector, an amplitude detector, or a frequency detector to remove signals representing unintended movement of the device 1. For example, a low pass filter may be used to remove or block noise or spurious signals representing brief, unintended movement of the device or other movement of the device that may occur during, for example, walking, jogging, or bouncing in a moving vehicle.

In another embodiment, the motion sensor 11 may be used in combination with a grip detector or a proximity sensor (not shown) in the unlocking function of the device 1. The grip detector may be used to recognize when the user is holding the device 1, touching the display screen 4, or pressing a button. The grip detector may include one or more switches and/or buttons to detect the presence of at least one finger. The proximity sensor may sense when the device 1 is in the user's hand so that the device 1 can ignore changes in position, orientation, or movement that are not based on the user's hand movements and/or positioning. By requiring the user to explicitly interact with a portion of the device 1 while moving the device 1, the possibility of inadvertently initiating the unlocking function is minimized or eliminated.

The device 1 also includes camera circuitry 12 that implements the digital camera functionality of the device 1. One or more solid state image sensors are built into the device 1, and each may be located at a focal plane of an optical system that includes a respective lens. An optical image of a scene within the camera's field of view is formed on the image sensor, and the sensor responds by capturing the scene in the form of a digital image or picture consisting of pixels that may then be stored in storage 13. The camera circuitry 12 may be used to capture the images that are analyzed by the processor 18 in the locking or unlocking functionality of the device 1. For example, the camera circuitry 12 may capture an image of a facial profile of an authorized user of the device 1, and this image may be stored with the images of authorized users 17 in the storage 13. When the camera circuitry 12 subsequently captures an image of a user who wants to unlock the device 1, the processor 18 may compare the facial profile in the subsequently captured image with the facial profiles in each image of the images of authorized users 17 to determine whether the user is an authorized user. This may be accomplished using suitable facial recognition software that matches faces that look like the same person.

Figure 3:
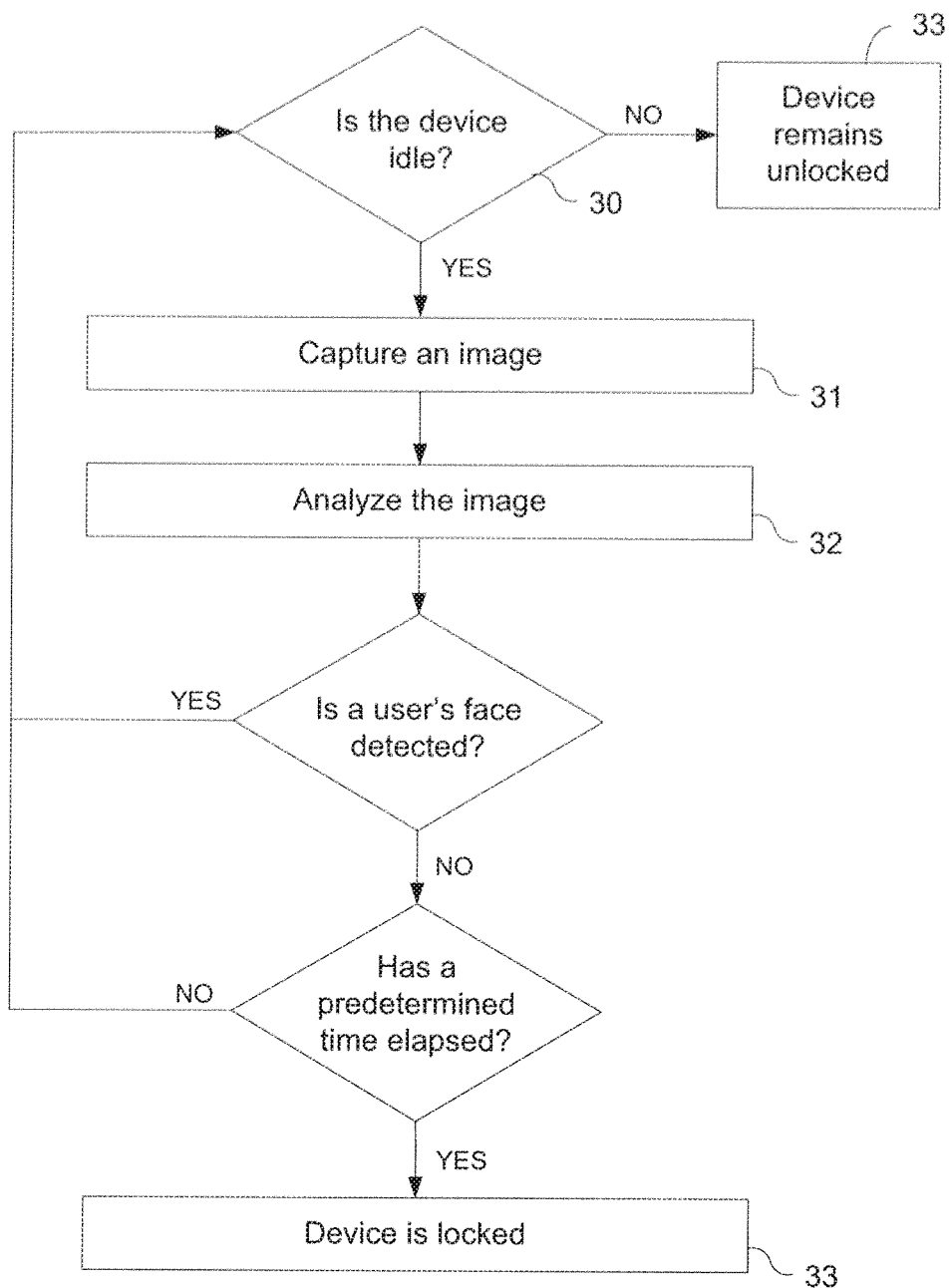
FIG. 3 is a flowchart showing the operations performed in the mobile device to implement the locking functionality.
Figure 4:
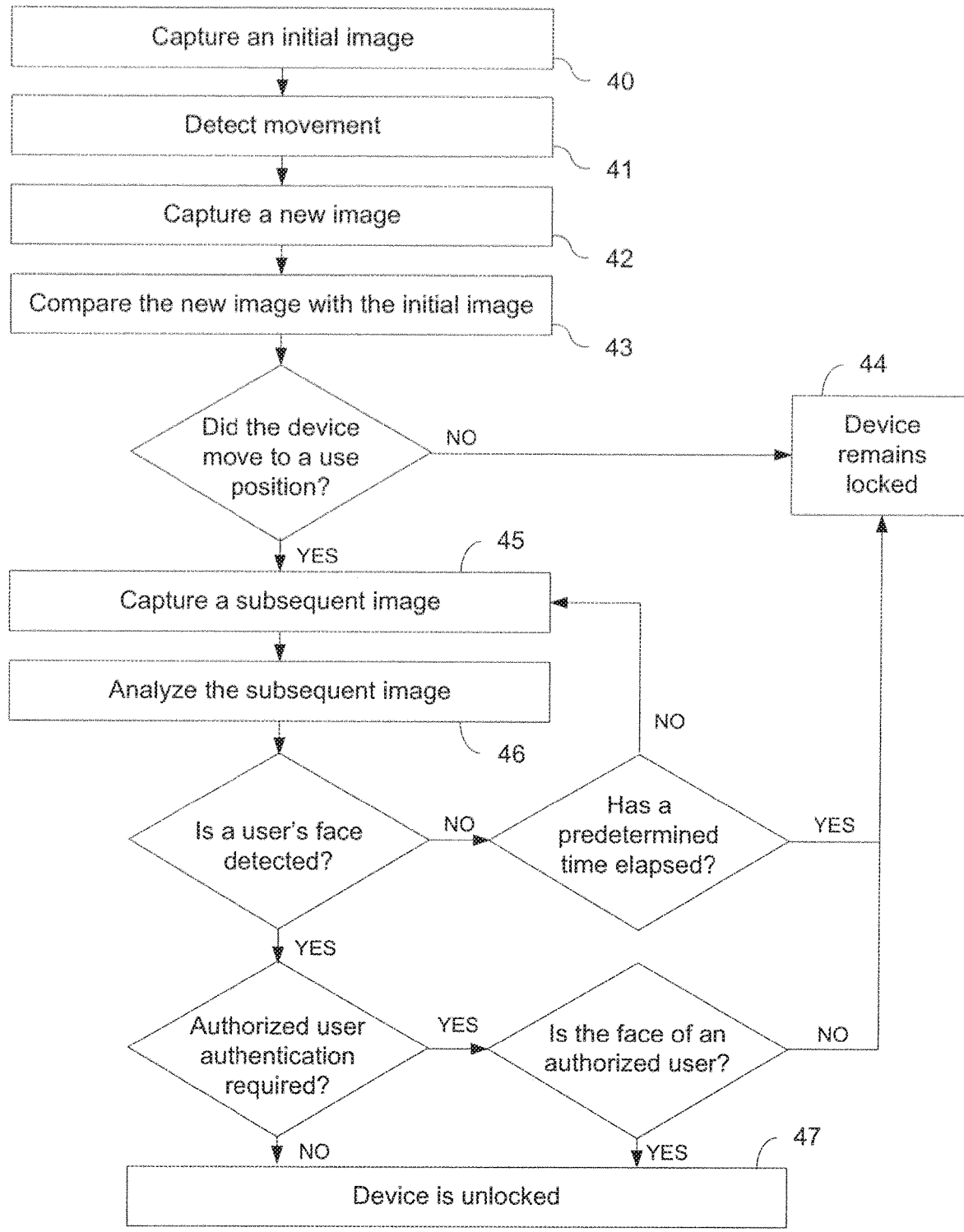
FIG. 4 is a flowchart showing the operations performed in the mobile device to implement the unlocking functionality.

The operations of a lock function of a device is shown in FIG. 3, and the operations of an unlock function is shown in FIG. 4. The operations shown in FIG. 3 and FIG. 4 may be performed by a suitably programmed processor (e.g., the main processor 18 of FIG. 2) in a device. Either functionality may be activated by the user selecting a mode of operation of the device that corresponds to the functionality. For example, the user may activate either functionality with a menu selection, by launching a special purpose application, or by depressing a manual switch.

The lock and unlock functions may be used to lock part or all of a device from use and to unlock part or all of a device for use. For example, the device may be turned on or off, the key pad (e.g., the keys used for dialing) may be enabled or disabled, the touch screen user input interface of the device may be enabled or disabled, and/or dialing or sending a telephone number to initiate a call may be enabled or disabled while still permitting the device to receive and to answer an incoming call. It will be appreciated that other functions may be turned on or off. Furthermore, specific functions may be enabled or disabled depending on the user of the device. For example, if the unlocking function detects that the user wanting to unlock the device is a child, the device may enable the applications or functions that are appropriate for a child and disable other functions such as dialing or sending a telephone number to initiate a call. The applications and functions of the device that are enabled and disabled by the unlocking and locking functions may be configurable by a user of the device.

FIG. 3 shows the operations performed by a mobile device to implement the locking functionality using facial recognition according to an embodiment of the invention. In an embodiment of the invention, the locking functionality may begin, while the device is unlocked, with the device detecting that it is idle (block 30). The device may be considered idle when there is no user interaction with the device. The user may be considered as interacting with the device when the user, for example, touches the display screen, presses a button, or intentionally moves the device. The device may also be considered idle when no user interactive foreground applications, e.g., a music player or a video player, are running.

In another embodiment, the locking functionality may begin when the device detects that it has been motionless for a predetermined threshold period of time. The device may be considered motionless when the user is not moving the device. This may be determined using the motion sensor 11, such as an accelerometer, to detect the absence of motion that is indicative of the device not being moved by the user. Alternatively or addition to the accelerometer, a light sensor may be used to detect that the user is not moving the device, e.g., to detect when the device is being carried in the user's pocket or purse where the intensity of ambient light is normally very low. The device may be considered motionless even with the presence of motion that may be considered noise such as motion that occurs as a result of being carried by the user while walking or jogging, or bouncing in a moving car, or some other type of motion that may be considered random motion or noise. The device may perform signal processing on the signal from the motion sensor as described above to filter out the random motion or noise. For example, a low pass filter may be used to remove or block noise or spurious signals representing brief, unintended movement of the device or other movement of the device that may occur during, for example, walking, jogging, or bouncing in a moving vehicle.

In response to detecting that it has been idle according to one embodiment or motionless according to another embodiment, the device will capture an image using its camera (e.g., the front-facing camera 3 of FIG. 1) (block 31). The device will then analyze the image to determine whether a user's face is present in the image (block 32). If a user's face is detected, the device repeats the operations of capturing and analyzing an image until a user's face is not detected for a predetermined period of a time or until the user interacts with or moves the device. While the user's face is detected or the user is interacting with or moving the device, the device remains unlocked (block 33). If a user's face is not detected in the images captured over a predetermined amount of time (e.g., one second), the device is automatically locked (block 34). The predetermined amount of time may be a setting that is configurable by the user of the device. In this way, the device is prevented from automatically locking when a user is still using the device to, for example, read a page of an electronic book, which does not require the user to be pressing any buttons or touching the display screen.

In another embodiment, the device may continuously capture and analyze the captured images while the device is powered on and unlocked without waiting for the device to become idle or motionless. A special low power mode of operation of the camera may be used to conserve power. For example, the camera may be configured to capture an image at one second intervals or the camera may be configured to capture an image in a resolution that is lower than the maximum resolution of its sensor array. In this case, the device will automatically lock if it does not detect a user's face for the predetermined amount of time. While the user's face is detected, the device will remain unlocked. In this embodiment, if a user is not looking at the display screen of the device for a certain period of time, the device will automatically lock without having to wait for an idle time counter to expire, a motion time counter to expire, or a manual lock by the user.

FIG. 4 shows the operations performed by a mobile device to implement the unlocking functionality of the device according to another embodiment of the invention. The unlocking functionality may begin with the device capturing an initial image using its camera (e.g., front-facing camera 3 of FIG. 1) (block 40). The device may capture this initial image at anytime while the device is locked. For example, the device may be configured to capture an initial image immediately after the device is locked, at predetermined time intervals, or, alternatively or additionally, in response to detecting movement of the device. The initial image may be used alone or in combination with a position or orientation signal from a motion sensor to determine the reference or initial position. This initial image and/or the initial position are stored in memory or storage of the device so that it can be used later in the unlocking function.

After capturing the initial image, the device monitors its motion sensor (e.g., motion sensor 11 of FIG. 2) to detect movement of the device (block 41). For example, an accelerometer may be used to detect movement of the device. Alternatively or additionally, a light sensor may be used to detect movement of the device by detecting a sudden change in ambient light intensity (e.g., when the user takes the device out of her pocket or purse). The device may be configured to detect intended movement of the device. Intended movement means that the movement of the device was intended as compared to motion that occurs as a result of being dropped, placed on a table or other surface, carried by the user while walking or jogging, or bouncing in a moving car or some other type of motion that may be considered random motion or noise. The device may detect intended movement by, for example, performing signal processing on the signal from the motion sensor as described above, or, alternatively or additionally, comparing the movement pattern to stored movement patterns that represent intended movement of the device. The device may also determine that the movement is intended by sensing that the device is in the user's hand using a proximity sensor or grip detector. Other ways of determining whether movement of the device was intended by the user are possible.

In response to detecting movement of the device, the device captures a new image using its camera (block 42). The new image may be used alone or in combination with the detected movement to determine whether the device moved to a use position. The use position is a position that indicates that a user is likely to want to use the device. The new image may be compared to the initial image (block 43) to determine whether there is a change in the position of the device, as indicated by, for example, the change in position of the objects in the initial image and the new image. Alternatively or additionally, the new image may be compared to the initial image to determine whether there is a change in the ambient light intensity between the images that is indicative of the user moving the device to a use position (e.g., when the user takes the device out of her pocket or purse). If the detected movement of the device was unintended (e.g., the device moved while still in a pocket or purse), the new image captured by the camera will be similar to the initial image. Comparing the new image with the initial image to determine whether the device moved to a use position may prevent the device from continuing with the remaining operations of the unlock function, which can result in additional power savings. If the device has not moved to a use position, the device remains locked (block 44). If the device has moved to a use position, the device captures a subsequent image of the external environment using its camera (block 45).

The subsequent image is then analyzed to detect a user's face (block 46). In one embodiment, the subsequent image is analyzed for a facial profile of a human face, without regard to a specific user. In this case, the device will only need to determine that a human facial profile is present in the subsequent image. If a user's face is detected, the device automatically unlocks (block 47). If a user's face is not detected, the device will continue to capture and analyze images until a predetermined amount of time has elapsed. Once the predetermined amount of time has elapsed and a user's face is not detected in any of the images, the device remains locked (block 44).

In another embodiment, detecting the user's face may also include verifying that the user is an authorized user of the device. The user may select that the device perform authorized user authentication during, for example, configuration of the device. Once the user has selected the authorized user authentication, the user has predetermined that not only should there be a facial profile in the subsequent image, but that it should also match a predetermined facial profile of an authorized user of the device. The predetermined facial profile may be determined from an image that was previously captured by the device's camera and stored in a storage of images of authorized users (e.g., images of authorized users 17 in storage 13 of the device 1 of FIG. 2). To aid the device in matching a facial profile, the display screen of the device may indicate where in the image the user's face must appear, while capturing the image with the predetermined facial profile and while capturing the subsequent image of a user that wants to use the device. When the device successfully matches the facial profile in the subsequent image to a facial profile in a stored image of an authorized user, the device automatically unlocks (block 47). If the authorized user authentication operation does not successfully find a match, the device remains locked (block 44). Authorized user authentication is akin to a secret password or other personal security information and may prevent unauthorized use of the device when, for example, the device is misplaced or stolen.

It should be noted that there may be multiple authorized users of a device. In this case, the database of images of authorized users would contain an image for each authorized user of the device. To match a facial profile in the subsequent image, the device would have to compare the subsequent image to each image in the database. Furthermore, each authorized user may have an associated unlocking profile in the database that indicates what functions or applications of the device are enabled when the device is unlocked.

Embodiments of the invention may include various operations as set forth above or fewer operations or more operations or operations in an order that is different from the order described. The operations may be embodied in machine-executable instructions that cause a general-purpose or special-purpose processor to perform certain operations. That is, the techniques may be carried out in a computer system or other data processing system in response to its processor, such as a microprocessor, executing sequences of instructions. Such a computer program may be stored or transmitted in a machine-readable medium. A machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media such as, but not limited to, a machine-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions), or a machine-readable transmission medium such as, but not limited to, any type of electrical, optical, acoustical or other form of propagated signals (e.g., carrier waves, infrared signals, digital signals, etc.).

Alternatively, these operations may be performed by specific hardware components that contain hardwired logic for performing the operations, or by any combination of programmed computer components and custom hardware components. Thus, the techniques are not limited to any specific combination of hardware circuitry and software or to any particular source for the instructions executed by the data processing system. In addition, throughout this description, various functions and operations are described as being performed by or caused by software code to simplify description. However, those skilled in the art will recognize that what is meant by such expressions is that the functions result from execution of code by a processor, such as a microprocessor.

For purposes of explanation, specific embodiments of the invention have been described to provide a thorough understanding of the present invention. These should not be construed as limiting the scope of the invention but merely as illustrating different examples and aspects of the invention. It should be appreciated that the scope of the invention includes other embodiments not discussed in detail above. Various other modifications, changes, and variations which will be apparent to those skilled in the art may be made in the arrangement, operation, and details of the systems and methods of the present invention disclosed herein without departing from the spirit and scope of the invention as defined in the appended claims. For instance, the device 1 is depicted in FIG. 1 as having the camera 3 and display screen 4 disposed on the same surface of the device; however, the camera 3 may be disposed on the opposite surface as the display screen 4 as in the case when the device is a digital camera. In this case, the device 1 may be configured to automatically power up (i.e., automatically unlock) and may be prevented from automatically powering down (i.e., automatically lock) when it detects a face in its frame of view. Therefore, the scope of the invention should be determined by the claims and their legal equivalents. Such equivalents include both currently known equivalents as well as equivalents developed in the future, i.e., any elements developed that perform the same function, regardless of structure. Furthermore, no element, component, or method step is intended to be dedicated to the public regardless of whether the element, component, or method step is explicitly recited in the claims.

What is claimed is:

1. A non-transitory machine-readable storage medium including instructions which, when executed by one or more processors, cause the one or more processors to perform a method to unlock a mobile device having one or more image sensors, the method comprising:
    capturing, in response to determining that the mobile device is in a use position, one or more images using the one or more image sensors;
    analyzing the one or more images to detect a face; and
    unlocking the mobile device in response to detecting the face, wherein the mobile device remains unlocked until it becomes locked again, wherein the mobile device automatically locks if the mobile device has not been moved for a predetermined period of time and the mobile device detects that a user is not looking at a display screen of the mobile device for the predetermined period of time based on an image having a resolution that is lower than a maximum resolution of the one or more image sensors.

2. The medium of claim 1 further comprising:
    detecting movement of the mobile device while the mobile device is locked; and
    determining, while the mobile device is locked, that the mobile device moved to the use position at least in part by comparing a movement pattern, using a statistical model, to one or more movement patterns associated with an unlocking function, wherein the one or more movement patterns are stored in the mobile device.

3. The medium of claim 1, wherein the method further comprises:
    detecting movement while the mobile device is in an unlocked state, and maintaining the mobile device in the unlocked state in response to detecting the detected movement while in the unlocked state.

4. The medium of claim 1, wherein the method further comprises:
    detecting that the mobile device has been idle while it is unlocked;
    capturing the image using the one or more image sensors while the mobile device is idle;
    analyzing the image to detect the face; and
    locking the mobile device when the face is not detected in the captured image.

5. The medium of claim 1, wherein the method further comprises:
    detecting that the mobile device has been idle while it is unlocked;
    capturing the image using the one or more image sensors while the mobile device is idle;
    analyzing the image to detect the face; and
    maintaining the mobile device in the unlocked state when the face is detected in the image.

6. The medium of claim 3, wherein the mobile device filters sensor data to remove spurious signals when detecting movement.

7. The medium of claim 6, wherein the spurious signals are filtered in response to a signal from an ambient light sensor.

8. The medium of claim 2, wherein the one or more movement patterns are stored in the mobile device, and wherein the method further comprises:
    detecting movement while the mobile device is in an unlocked state, and
    maintaining the mobile device in the unlocked state in response to detecting the detected movement while in the unlocked state.

9. The medium of claim 2, wherein the one or more movement patterns are stored in the mobile device, and wherein the method further comprises:
    detecting that the mobile device has been idle while it is unlocked;
    capturing the image using the one or more image sensors while the mobile device is idle;
    analyzing the image to detect the face; and
    locking the mobile device when the face is not detected in the captured image.

10. The medium of claim 9, wherein the method further comprises:
    maintaining the mobile device in the unlocked state when the face is detected in the image.

11. The medium of claim 8, wherein movement is detected by a tilt sensor in the mobile device.

12. The medium of claim 9, wherein movement is detected by a tilt sensor in the mobile device.

13. A method to unlock a mobile device having one or more image sensors, the method comprising:
    capturing, in response to determining that the mobile device is in a use position, one or more images using the one or more image sensors;
    analyzing the one or more images to detect a face; and
    unlocking the mobile device in response to detecting the face, wherein the mobile device remains unlocked until it becomes locked again, wherein the mobile device automatically locks if the mobile device has not been moved for a predetermined period of time and the mobile device detects that a user is not looking at a display screen of the mobile device for the predetermined period of time based on an image having a resolution that is lower than a maximum resolution of the one or more image sensors.

14. The method of claim 13 further comprising:
detecting movement of the mobile device while the mobile device is locked; and
determining, while the mobile device is locked, that the mobile device moved to the use position at least in part by comparing a movement pattern, using a statistical model, to one or more movement patterns associated with an unlocking function, wherein the one or more movement patterns are stored in the mobile device.

15. The method of claim 13 wherein the method further comprises:
detecting movement while the mobile device is in an unlocked state, and maintaining the mobile device in the unlocked state in response to detecting the detected movement while in the unlocked state.

16. The method of claim 13, wherein the method further comprises:
detecting that the mobile device has been idle while it is unlocked;
capturing the image using the one or more image sensors while the mobile device is idle;
analyzing the image to detect the face; and
locking the mobile device when the face is not detected in the captured image.

17. The method of claim 13, wherein the method further comprises:
detecting that the mobile device has been idle while it is unlocked;
capturing the image using the one or more image sensors while the mobile device is idle;
analyzing the image to detect the face; and
maintaining the mobile device in the unlocked state when the face is detected in the image.

18. The method of claim 15, wherein the mobile device filters sensor data to remove spurious signals when detecting movement.

19. The method of claim 18, wherein the spurious signals are filtered in response to a signal from an ambient light sensor.

20. The method of claim 14, wherein the one or more movement patterns are stored in the mobile device, and wherein the method further comprises:
detecting movement while the mobile device is in an unlocked state, and
maintaining the mobile device in the unlocked state in response to detecting the detected movement while in the unlocked state.

21. The method of claim 14, wherein the one or more movement patterns are stored in the mobile device, and wherein the method further comprises:
detecting that the mobile device has been idle while it is unlocked;
capturing the image while the mobile device is idle;
analyzing the image to detect the face; and
locking the mobile device when the face is not detected in the image.

22. The method of claim 21, wherein the method further comprises:
maintaining the mobile device in the unlocked state when the face is detected in the image.

23. The method of claim 20, wherein movement is detected by a tilt sensor in the mobile device.

24. The method of claim 21, wherein movement is detected by a tilt sensor in the mobile device.

25. A non-transitory machine-readable storage medium including instructions which, when executed by one or more processors, cause the one or more processors to perform a method to unlock a mobile device having one or more image sensors, the method comprising:
detecting movement of the mobile device while the mobile device is locked;
determining, while the mobile device is locked, that the mobile device moved to a use position at least in part by comparing a movement pattern, using a statistical model, to one or more movement patterns associated with an unlocking function;
in response to determining that the mobile device is in the use position, capturing one or more images using the one or more image sensors;
analyzing the one or more images to detect a face; and
unlocking the mobile device in response to detecting the face, wherein the mobile device remains unlocked until it becomes locked again, wherein the mobile device automatically locks if the mobile device has not been moved for a predetermined period of time and the mobile device detects that a user is not looking at a display screen of the mobile device for the predetermined period of time based on an image having a resolution that is lower than a maximum resolution of the one or more image sensors, and wherein the predetermined period of time is configurable.

26. The medium of claim 25, wherein the one or more movement patterns are stored in the mobile device.

27. The medium of claim 25, wherein the method further comprises:
detecting movement while the mobile device is in an unlocked state, and maintaining the mobile device in the unlocked state in response to detecting the detected movement while in the unlocked state.

28. The medium of claim 25, wherein the method further comprises:
detecting that the mobile device has been idle while it is unlocked;
capturing the image using the one or more image sensors while the mobile device is idle;
analyzing the image to detect the face; and
locking the mobile device when the face is not detected in the captured image.

* * * * *